United States Patent

Linders

[15] 3,699,441

[45] Oct. 17, 1972

[54] POLYPHASE SIGNAL MONITORING SYSTEM

[72] Inventor: John R. Linders, 23609 Lake Road, Bay Village, Ohio 44140

[22] Filed: Jan. 4, 1971

[21] Appl. No.: 103,659

[52] U.S. Cl. ..................324/86, 324/82, 324/108
[51] Int. Cl. ..................G01r 25/00, G01r 23/12
[58] Field of Search .....324/86, 82, 107, 108; 317/47

[56] References Cited

UNITED STATES PATENTS

| | | | |
|---|---|---|---|
| 2,854,631 | 9/1958 | Annich et al. | 324/107 |
| 1,684,056 | 9/1928 | Evans | 324/108 |
| 2,009,708 | 7/1935 | Shuck | 324/107 |

*Primary Examiner*—Alfred E. Smith
*Attorney*—Watts, Hoffmann, Fisher & Heinke

[57] ABSTRACT

A signal monitoring system for monitoring and measuring the value of certain parameters of a polyphase alternating-current signal. The monitoring system includes a circuit arrangement for developing from a polyphase supply line a pair of signals which may be defined by a pair of phasors having common midpoints. Each of these signals is then resolved into a component signal which is shifted from the corresponding signal by a predetermined number of degrees. The values of the component signals may then be measured and compared to determine parameters, including the positive and negative phase sequence voltage, current, and power, as well as the frequency, of the polyphase alternating-current signal.

60 Claims, 16 Drawing Figures

*Fig. 1*

INVENTOR.
JOHN R. LINDERS

INVENTOR
JOHN R. LINDERS

INVENTOR.
JOHN R. LINDERS

POLYPHASE SIGNAL MONITORING SYSTEM

CROSS REFERENCES TO RELATED PATENTS

U.S. Letters Pat. No. 1,571,224, to C. T. Allcutt, entitled "Measuring Device," issued on Feb. 2, 1926, and assigned to Westinghouse Electric and Manufacturing Company.

U.S. Letters Pat. No. 1,531,601, to R. D. Evans, entitled, "Electrical Protective Device," issued on Mar. 31, 1925, and assigned to Westinghouse Electric and Manufacturing Company.

U.S. Letters Pat. No. 2,009,708, to G. R. Shuck, entitled, "Metering System," and issued on July 30, 1935.

BACKGROUND OF THE INVENTION

This invention pertains to the art of electrical circuits for monitoring and/or measuring certain parameters of a polyphase alternating-current signal, and more particularly, to a signal monitoring system for measuring parameters, including the positive and negative phase sequence components of voltage, current, and power, as well as the frequency, of a polyphase alternating-current signal.

The concept of resolving an unbalanced polyphase alternating-current system into its positive phase sequence components, negative phase sequence components, and zero phase sequence components is well known. The true power in an unbalanced polyphase system can be determined by adding the values of the power in the positive phase sequence, the power in the negative phase sequence, and the power in the zero phase sequence. Similarly, the reactive power of an unbalanced polyphase system may be determined by adding the reactive powers of the positive, negative, and zero phase sequences.

It is also known that in the operation of a polyphase motor, even a relatively small unbalanced condition on the polyphase supply line substantially increases the motor losses and therefore the energy input to operate the motor. This increased energy is generally a result of an increase in the amount of energy which is dissipated in the form of heat in the motor. As is apparent, with an increase in the amount of heat dissipated by the motor, there is an increase in the kilowatt hours of energy supplied by a utility company, resulting in an increased operating cost without any increase in the useful power which is supplied by the motor.

In addition, with an increase in the amount of heat generated within a motor, there is an increased chance of motor failure due to overheating of the stator or rotor windings, overheating of bearings, et cetera. Frequently, a motor of a larger size with higher heat dissipating characteristics is utilized to carry out the same function in order to prevent excessive motor failures. With an increase in the motor size, there may be a further increase in the power consumption thereby further increasing the operating cost.

The increased temperature rise of an alternating-current motor resulting from an unbalanced condition on a polyphase supply line is typically as follows:

| | | | |
|---|---|---|---|
| Percentage Voltage Unbalance: | 0% | 2% | 3½% |
| Percentage Added Heat: | 0% | 8% | 25% |
| Temperature Rise at Rated Load: | | | |
| Class A | 60°C | 65°C | 75°C |
| Class B | 80°C | 86.4°C | 100°C |

While it is possible to rebalance polyphase alternating-current supply systems, such as by transposition of conductors or otherwise readjusting the system, one major concern is that voltage unbalance conditions are generally unknown and ignored by the consumer. Also, a voltage unbalance condition may be intermittent and, in the absence of continuous monitoring of the voltage supply lines, this condition may never be brought to the attention of the consumer.

Electrical circuits for monitoring and measuring the power of positive and negative phase sequence components in polyphase alternating-current supply systems, have heretofore included transformers having their primary winding coupled to the lines of a three-phase supply system. Complex impedance networks (reactive and resistive) are coupled to the secondary windings of the transformers in order to separate either the positive or the negative phase sequence component. Examples of systems for measuring either the positive or the negative phase sequence components in a polyphase supply system are illustrated in the above-referenced patents to C. T. Allcutt, R. D. Evans and G. R. Shuck. In addition, the above-referenced patent to R. D. Evans illustrates an electrical protective system which monitors the positive and negative phase sequence component of current in order to de-energize a motor whenever the value of the negative phase sequence component of current reaches a predetermined relative level.

One problem associated with known phase sequence component monitoring systems is that inaccurate indications result from variations in the frequency of the monitored signal. In other words, these systems are, to a large extent, frequency dependent. This frequency dependency generally results from the fact that as the frequency which is applied to a reactive network varies, there is a variation in the voltage potential and phase angle of the signal developed by the reactive network. Thus, inaccuracies are introduced into the measurement of the positive and negative phase sequence components, thereby limiting the usefulness of these systems.

Another problem associated with known phase sequence monitoring systems is that the value of the circuit components, i.e., resistors, inductors, capacitors, are dependent on the number of phases to be measured. In other words, if the value of the circuit components in a monitoring system are designed for three-phase operation, these systems cannot be utilized to measure the value of the sequence components in a four-phase supply system.

Many attributes of a polyphase system may be derived by considering the geometry of the system phasors. For example, in a three-phase system, ignoring the zero-sequence components, the system voltages may be defined by any three bits of information representative of the magnitudes and phase angles of the system, assuming one bit of information represents magnitude. Accordingly, in resolving a system into its phase sequence components, if less than three bits of information are retained, the system is not fully described or defined. Thus, the negative sequence phasor, while significant, does not completely define the system from which it is derived.

SUMMARY OF THE INVENTION

The present invention is directed toward a frequency independent polyphase signal monitoring system for measuring parameters of a polyphase supply, thereby overcoming the noted disadvantages, and others, of such previous systems.

In accordance with one aspect of the present invention, there is provided a polyphase signal monitoring system. The monitoring system includes a first circuit for developing a first signal of a predetermined amplitude, and a second circuit for developing a second signal having an amplitude substantially equal to the predetermined amplitude and being substantially ninety degrees out of phase with respect to the first signal when the polyphase system is in balance. A phase shifting network is coupled to the first circuit for developing a third signal being a predetermined number of degrees out of phase with respect to the first signal, and another phase shifting network is coupled to the second circuit for developing a fourth signal being a predetermined number of degrees out of phase with respect to the second signal. A signal monitoring device is coupled to the two phase shifting networks for providing an output indication of the relative values of the third signal and the fourth signal. The output indication provided by the signal monitoring device may be utilized to determine certain parameters of the polyphase supply system, such as the value of the positive and negative negative phase sequence voltage, current, power, et cetera.

In accordance with another aspect of the present invention, the signal monitoring device includes a circuit for providing an output indication of the difference between the value of the third signal and the value of the fourth signal.

In accordance with another aspect of the present invention, the signal monitoring device includes a circuit for providing an output indication of the sum of the value of the third signal and the value of the fourth signal.

In accordance with another aspect of the present invention, there is provided a polyphase signal monitoring system comprising a first circuit for developing a first signal having a value representative of the sum of the value of a positive phase sequence component of a polyphase signal and the negative sequence component. A second circuit for developing a second signal having a value representative of the value of the difference between the positive sequence component and the negative phase sequence component of a polyphase signal, a summing circuit for developing a first output signal having a value equal to the positive sequence component, and a difference circuit for developing a second output signal having a value equal to the negative sequence component.

In accordance with another aspect of the present invention, there is provided a polyphase signal monitoring system comprising a first circuit for developing a first signal which defines a first phasor, and a second circuit having a common midpoint with respect to the first phasor for developing a second signal which defines a second phasor. A first phase shifting network is coupled to the first circuit for developing a third signal being a predetermined number of degrees out of phase with respect to the first signal, and a second phase shifting network is coupled to the second circuit for developing a fourth signal being a predetermined number of degrees out of phase with respect to the second signal. Signal monitoring devices coupled to the two phase shifting networks provide output indications of the difference between the value of the third signal and the value of the fourth signal. The output indications may then be utilized to determine certain parameters of the polyphase supply system.

In accordance with another aspect of the present invention, the signal monitoring device is coupled to the first and second phase shifting network means for providing an output indication of the sum of the values of the third signal and the fourth signal. The output indication provided by the signal monitoring device may then be utilized to determine certain other parameters of the polyphase supply system, such as the value of the positive phase sequence voltage, current, power, et cetera.

In accordance with another aspect of the present invention, the output circuits of the first and second circuits are connected in common to provide a common reference point.

In accordance with another aspect of the present invention, the first phase shifting network includes a substantially reactive circuit element and a resistive circuit element coupled across the output circuit of the first circuit for providing the third signal which is a predetermined number of degrees out of phase with respect to the first signal.

In accordance with another aspect of the present invention, the second phase shifting network includes a reactive element and a resistive element coupled across the output circuit of the second circuit for providing the fourth signal which is a predetermined number of degrees out of phase with respect to the second signal.

In accordance with another aspect of the present invention, the first circuit includes a transformer having a primary circuit adapted to be coupled to two of the supply lines and a secondary circuit for developing the first signal.

In accordance with another aspect of the present invention, the second circuit includes a transformer having a primary circuit coupled to the third supply line and a secondary circuit for developing the second signal.

In accordance with another aspect of the present invention, the phase shifting networks are each coupled across the secondary winding of a corresponding one of the transformers.

It is therefore an object of the present invention to provide a signal monitoring system for monitoring the value of certain parameters of a polyphase signal.

Another object of the present invention is to provide a signal monitoring system for monitoring and measuring the value of the negative phase sequence voltage, current, phase aNgle, power, et cetera, in a polyphase supply system.

Another object of the present invention is to provide a signal monitoring system for monitoring and measuring the value of the positive phase sequence voltage, current, phase angle, power et cetera, in a polyphase supply system.

A further object of the present invention is to provide a signal monitoring system for monitoring and measuring the frequency of a polyphase signal.

Another object of the present invention is to provide a signal monitoring system which is substantially unaffected by variations in the frequency of the polyphase supply signal.

A further object of the present invention is to provide a signal monitoring system which may be utilized to monitor and measure various parameters of a three-phase, four-phase, five-phase, et cetera, supply system without varying the component values or arrangement of circuit elements in the monitoring system.

These and other objects and advantages of the invention will become apparent from the following description of preferred embodiments of the invention as read in conjunction with the accompanying drawings in which:

DESCRIPTION OF THE PREFERRED EMBODIMENT

Figure 1:
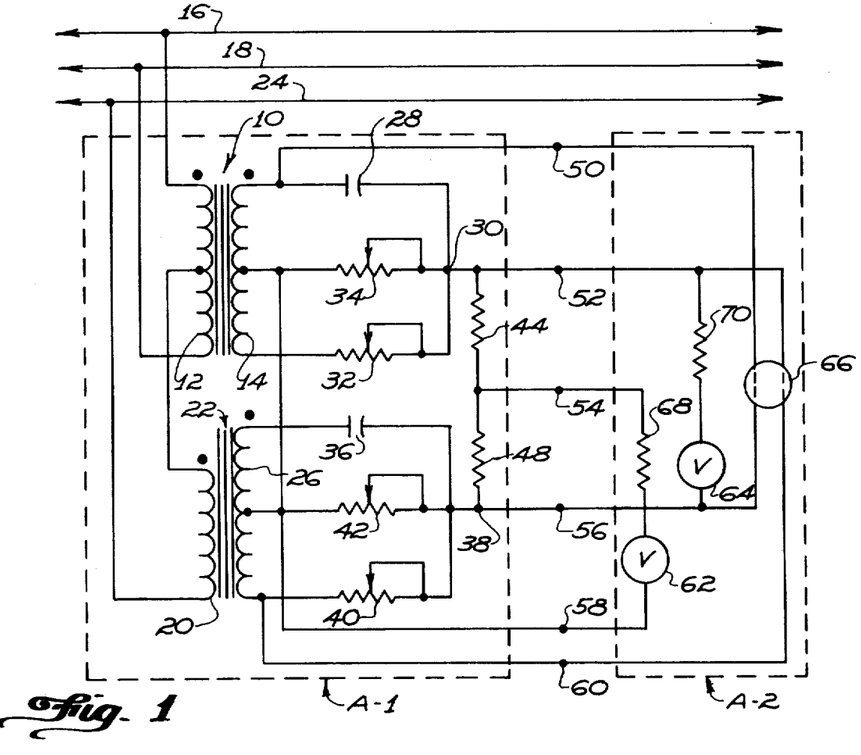
FIG. 1 is an electrical schematic diagram illustrating in basic form a preferred embodiment of the polyphase signal monitoring system of the present invention.

FIG. 1 illustrates in basic form a preferred embodiment of the polyphase signal monitoring system coupled to a three-phase supply system for monitoring certain parameters of a three-phase signal. The signal monitoring system generally comprises a signal separating circuit A-1, and a monitoring circuit A-2.

More particularly, the signal separating circuit A-1 includes a transformer 10 having a center-tapped primary winding 12 and a center-tapped secondary winding 14. The polarity and non-polarity terminals of the primary winding 12 of transformer 10 are respectively coupled to a first phase supply line 16 and a second phase supply line 18 of the three-phase supply system. The center-tap terminal of the primary winding 12 is connected directly to the polarity terminal of a primary winding 20 of another transformer 22. The non-polarity terminal of the primary winding 20 of the transformer 22 is connected directly to a third phase supply line 24 of the three-phase supply system.

As illustrated, the transformer 22 also includes a center-tapped secondary winding 26 having the center-tap terminal connected directly to the center-tap terminal of the secondary winding 14 of transformer 10. The polarity terminal of the secondary winding 14 of transformer 10 is coupled through a capacitor 28 to a juncture point 30, the non-polarity terminal of the secondary winding 14 is coupled through a potentiometer 32 to the juncture point 30, and the center-tap terminal of the secondary winding 14 is coupled through a potentiometer 34 to the juncture point 30. Also, the movable contacts of the potentiometers 32, 34, are connected in common to the juncture point 30.

Similarly, the polarity terminal of the secondary winding 26 of transformer 22 is coupled through a capacitor 36 to a juncture point 38, the non-polarity terminal of the secondary winding 26 is coupled through a potentiometer 40 to the juncture point 38, and the center-tap terminal of secondary winding 26 is coupled through a potentiometer 42 to the juncture point 30. Also, the movable contacts of potentiometers 40, 42 are connected in common to the juncture point 38.

A pair of series-connected resistors 44, 48 are connected between the two juncture points 30, 38. With this circuit arrangement, the polarity terminal of the secondary winding 14 of transformer 10 provides an output terminal 50, the juncture point 30 provides an output terminal 52, and the juncture point between the resistors 44, 48 provides an output terminal 54. Also, the juncture point 38 provides an output terminal 56, the commonly-connected center-tap terminals of secondary winding 14, 26 provide an output terminal 58, and the non-polarity terminal of the secondary winding 26 of transformer 22 provides an output terminal 60. While this and other figures show adjustable potentiometers to compensate for variations in theoretical component values, it is to be understood that adjustable reactances could also be used.

As illustrated in FIG. 1, the monitoring circuit A-2 is generally comprised of a pair of volt meters 62, 64 and an electronic ratio detector meter 66. More particularly, the volt meter 62 is connected in series with a resistor 68 between the two output terminals 54, 58 for measuring the value of the positive-phase sequence voltage signal. The volt meter 64 is connected in series with a resistor 70 between the two output terminals 54, 56 for measuring the value of the negative-phase sequence voltage signal. In addition, the electronic ratio detector meter 66, which takes the form of a device for measuring the ratio of the voltage across the terminals 50, 56 with respect to the voltage across the output terminals 52, 60, provides an output indication of the frequency of the signal applied to the three-phase supply line.

Figures 2A, 2B, 2C, 2D:
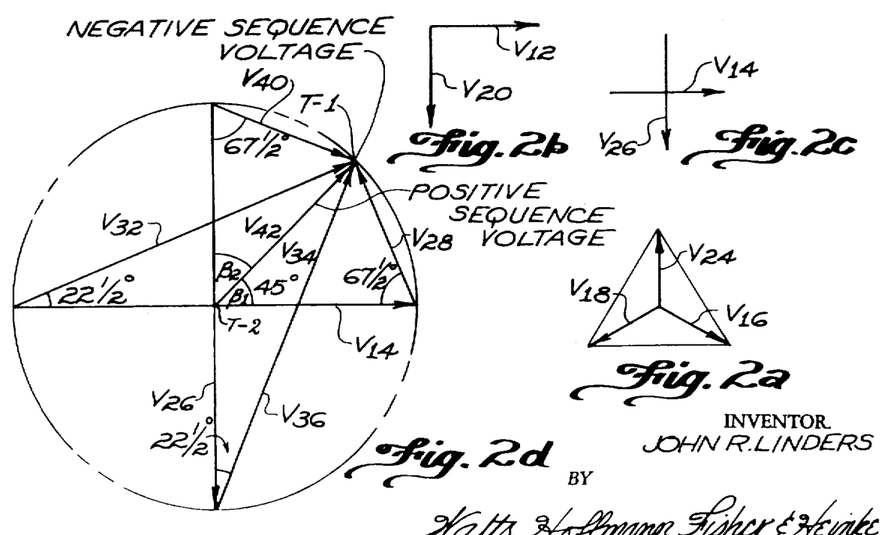
FIGS. 2a through 2d are phasor diagrams illustrating the voltage phasors of the signal monitoring system as shown in FIG. 1 under balanced three-phase conditions.

Reference is now made to FIGS. 2a through 2d which are phasor diagrams illustrating the operation of the signal monitoring system of FIG. 1 under balanced three-phase conditions. More particularly, FIG. 2a is a phasor diagram illustrating the three voltage phasors which appear on the supply lines 16, 18, 24. The phasor $V_{16}$ represents the voltage appearing on the first supply line 16, the phasor $V_{18}$ represents the voltage appearing on the second supply line 18, and the phasor $V_{24}$ represents the voltage appearing on the third supply line 24, each to neutral.

FIG. 2b is a phasor diagram illustrating the phasor voltages appearing across the primary windings of transformers 10, 22. The voltage phasor $V_{12}$ represents the voltage appearing across the primary winding 12 of transformer 10, and the voltage phasor $V_{20}$ represents the voltage appearing across the primary winding 20 of transformer 22. These phasors extend at 90° with respect to each other.

FIG. 2c is a phasor diagram representing the phasor voltages appearing across the secondary windings of the transformers 10, 22. The phasor voltage $V_{14}$ represents the voltage appearing across the secondary winding 14 of transformer 10, and the phasor voltage $V_{26}$ represents the voltage appearing across the secondary winding 26 of transformer 22. As illustrated, the phasor voltages appearing across the secondary windings of the transformers 10, 22 are in phase with the corresponding phasor voltages applied to the primary windings of these transformers and therefore also extend at ninety degrees with respect to each other. The commonly-connected center-tap terminals of the secondary windings 14, 26 result in the phasor voltages $V_{14}$, $V_{26}$ having common midpoints as illustrated in FIG. 2c. Thus, the phasor voltages $V_{14}$, $V_{26}$ extend at right angles with respect to each other and intersect each other at a common midpoint reference.

Also, the transformers 10, 22 are constructed so that the amplitude of the voltage phasor $V_{14}$ equals the amplitude of the voltage phasor $V_{26}$. These phasor amplitudes are made equal by providing the transformer 22 with a primary winding 20 having 0.867 as many turns as the number of turns in the primary winding 12 of the transformer 10. The secondary winding 14 of the transformer 10 has the same number of turns as the secondary winding 26 of the transformer 22.

The values of the capacitor 28 and the potentiometer 32 are chosen so that the voltage appearing across the potentiometer winding 32 leads the voltage which appears across the secondary winding 14 of transformer 10 by a phase angle of 22½° at the operating frequency. The values of the capacitor 36 and the potentiometer 40 are chosen so that the voltage signal appearing across the potentiometer 40 leads the voltage which appears across the secondary winding 26 of the transformer 22 by a phase angle of 67½° at the operating frequency. The potentiometers 32, 40 may be adjusted so that the corresponding phase angles may be obtained.

The potentiometers 34, 42 are of high ohmic value. These potentiometers compensate for slight inaccuracies in the construction of the primary and secondary windings of the transformers 10, 22. Thus, these potentiometers are adjusted until the magnitude of the voltage appearing across the potentiometer 34 is equal to the voltage appearing across the potentiometer 42 under balanced three-phase conditions and with the phase shifting networks adjusted as described.

FIG. 2d illustrates in more detail the operation of the two phase shifting networks including the capacitors 28, 36 and the potentiometers 32, 40. More particularly, the voltage phasors $V_{14}$, $V_{26}$ again represent the voltage signals appearing across the secondary windings 14, 26 of the transformers 10, 22, respectively. The voltage phasor $V_{32}$ represents the voltage appearing across the potentiometer 32 which, as previously described, leads the voltage which appears across the secondary winding 14 by a phase angle of 22½°. The resultant voltage phasor $V_{28}$ represents the voltage which appears across the capacitor 28.

Also, as illustrated in FIG. 2d, the voltage phasor $V_{40}$ represents the voltage which appears across the potentiometer 40 and, as previously described, leads the voltage which appears across the secondary winding 26 by a phase angle of 67½°. The resultant voltage phasor $V_{36}$ represents the voltage which appears across the capacitor 36. Thus, the phase angles which exist between the voltages 32, 40 and the corresponding transformer voltages are complementary angles.

In all of the phasor diagrams the turns ratios of transformers 10 and 22 are assumed exact. Thus, the effect of potentiometers 34 and 42 to properly equalize the respective voltages out of these transformers is negligible and is not illustrated in the diagrams for clarity.

As illustrated in FIG. 1, the volt meter 64 is connected to measure the difference in the value of the voltage developed across the resistor 34 and the value of the voltage developed across resistor 42. This voltage difference which appears across terminals 52 and 56 represents the negative phase sequence voltage, and under balanced conditions as illustrated in FIG. 2, equals zero volts. The volt meter 62 is connected, by virtue of resistor 44 being equal in value to resistor 48, to measure the value of the average voltage developed across resistor 34 and resistor 42. This voltage is the voltage on terminal 54 with respect to terminal 58. The indication developed by the volt meter 62 equals to one half of the value of the positive phase sequence voltage, as illustrated in FIG. 2.

As illustrated in FIG. 2d, as the frequency of the three-phase signal varies, the voltages developed at terminals 52, 56 and 54, noted as point T-1 in FIG. 2, merely travel along a locus defined by a circle whose center is the common midpoint of phasors $V_{14}$ and $V_{26}$. Thus, even with a variation in the frequency, the difference in the voltages which appear across the resistors 34, 42 remains essentially zero volts. Accordingly, a variation in the nominal frequency of the system will have no appreciable effect on the value of the negative phase sequence output voltage. A 10 percent variation in frequency will cause less than 0.5 percent output voltage across these negative sequence terminals 52, 56. This negligible error voltage will vary with frequency in accordance to the following equation:

$$\text{error voltage} = \left(2 - \frac{1+(w_1/w_0)^2}{w_1/w_0}\right) \times \sin 22\tfrac{1}{2}°$$

where $w_1$ is the actual polyphase line frequency and $w_0$ is the reference frequency to which the system is balanced or calibrated.

Similarly, since the point T-1 remains on the circle with a variation in frequency, the positive phase sequence voltage magnitude is even less affected by variations in frequency than the negative sequence voltage.

The phase shifting networks including the capacitors 28, 36 and potentiometers 32, 40, are however, individually responsive to variations in the frequency of the polyphase signal. Thus, the angles between the positive phase sequence voltage phasor and the voltages developed across the secondary windings 14 and 26 will vary with variations in frequency as noted in connection with the locus of T-1. This variation in the phase angles may be utilized to determine the frequency of the polyphase signal. This phase angle will vary from the reference position of 45° in accordance with the following equation:

$$\text{change in phase angle} = \tan^{-1}\left(\frac{1-(w_1/w_0)^2}{(w_1/w_0)}\right)$$

where $w_1$ is the actual polyphase line frequency and $w_0$ is the reference frequency to which the system was balanced. Thus, by measuring the angles between the phasors $V_{14}$ and $V_{26}$, and the positive phase sequence phasor, it is possible to monitor or measure the line frequency. The electronic ratio detector meter 66 measures the ratio between the voltages which appear across the terminals 50, 56 and the terminals 52, 60. The ratio of these two voltages is equal to the ratio of the tangents of the two angles to be measured, i.e., if the ratio equals one, the phase angles are equal and the frequency is the frequency to which the system is calibrated.

Reference is now made to FIGS. 3a through 3d which are voltage phasor diagrams for the signal monitoring system of FIG. 1 when the system is utilized to measure parameters of a representative unbalanced three-phase signal.

Figure 3A:
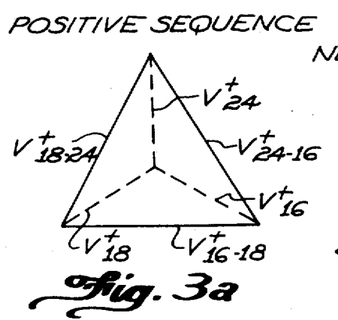
FIGS. 3a through 3d are phasor diagrams illustrating the voltage phasors of the signal monitoring system shown in FIG. 1 under an unbalanced three-phase condition.
Figures 3B, 3C:
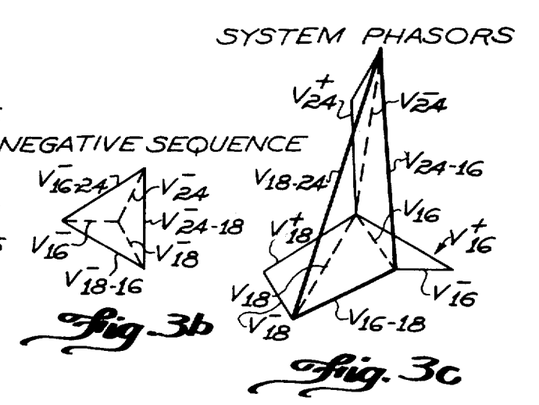

FIG. 3a illustrates the positive phase sequence components which exist across the supply lines 16, 18, 24, respectively. FIG. 3b illustrates the negative phase sequence components which exist across the supply lines 16, 18, 24, respectively.

FIG. 3c is a phasor diagram illustrating the distorted voltage phasors which actually exist on the supply lines 16, 18, 24. Thus, the voltage phasor $V_{16}$ represents the voltage signal appearing on line 16, the voltage phasor $V_{18}$ represents the voltage appearing on line 18, and the voltage phasor $V_{24}$ represents the voltage appearing on line 24. The resultant phasors $V_{16} - V_{18}$; $V_{18} - V_{24}$, $V_{24} - V_{16}$ represent the voltages appearing across the supply lines 16, 18, the supply lines 18, 24, and the supply lines 24, 16, respectively.

Figure 3D:
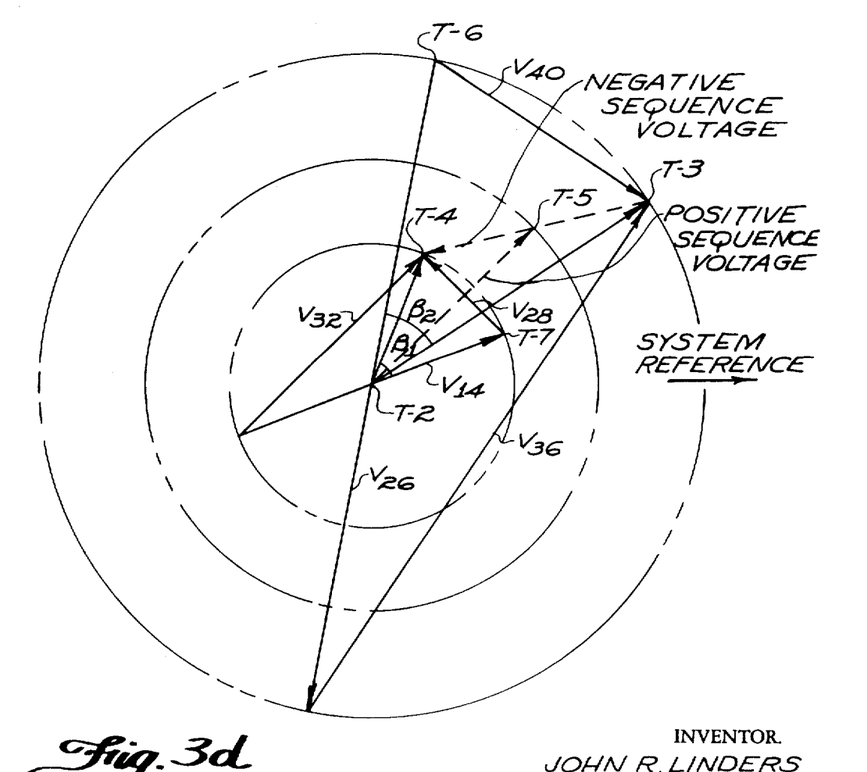

Reference is now made to FIG. 3d which is a composite phasor diagram of an unbalanced system comparable to FIG. 3c corresponding to the phasor diagram of FIG. 2d for a balanced three-phase condition on the supply line. More particularly, the unbalanced conditions on the supply lines cause the voltage phasors $V_{14}$; $V_{26}$ which appear across the secondary windings 14, 26 of the transformers 10, 22 to become unequal in amplitude but retain their common midpoint, T-2. Also, the phase angle between these phasors has increased from 90° to approximately 135° due to the unbalanced conditions on the supply lines.

With this unbalanced condition on the supply lines, the point T-3 and the point T-4 become separated to thereby define a negative sequence voltage. The negative sequence voltage again equals to the difference in potential between the output terminal 52 and the output terminal 56 and is measured by the volt meter 64 with calibrating resistor 70 adjusted to provide a true indication.

The positive sequence voltage, i.e., the phasor voltage between the point T-2 and the point T-5 is again the average value of the voltages developed across the potentiometers 34, 42. The positive sequence voltage is in fact the sum of the voltages between points T-3 and T-2, and points T-4 and T-2. Thus the volt meter 62 can be calibrated with resistor 68 to read twice the normal value so that the average value of the voltage across resistors 34 and 42 is indicated as the actual positive sequence value.

The phase angle of the positive and negative sequence output voltages are each 45° ahead of the reference phase sequence components of the three-phase system. This 45° relationship exists under all balanced and unbalanced conditions. Thus, the meters 62, 64 may also be replaced with suitable meters to determine phase information. Accordingly, the phase-to-phase conditions on the three-phase system are utilized as the determining parameters. These parameters are exact and may be conventionally converted to phase to neutral values for the positive and negative sequence components. The zero phase sequence component must also be included to determine the actual phase-to-neutral voltages of the system, if the system has a neutral.

The system frequency information is still accurately contained within the phasor system even with the unbalanced condition. The phase angles $B_1$, $B_2$ are always equal to 45° when the system frequency is at calibration. These angles change inversely with respect to each other when the frequency departs from the calibration value. Thus, a comparison of these two phase angles yields the frequency as described in connection with FIG. 2. The geometry illustrates that the ratio of the tangents of the phase angles $B_1$ and $B_2$ may be determined by comparison of the magnitudes of the points T-4, T-6 and T-3, T-7. Thus, comparison is accomplished with the electronic ratio detector as described with respect to FIG. 2. The measurement of "three-phase" frequency has the advantage over conventional single phase determinations in that loss of one phase voltage still permits this frequency measurement.

Figure 4:
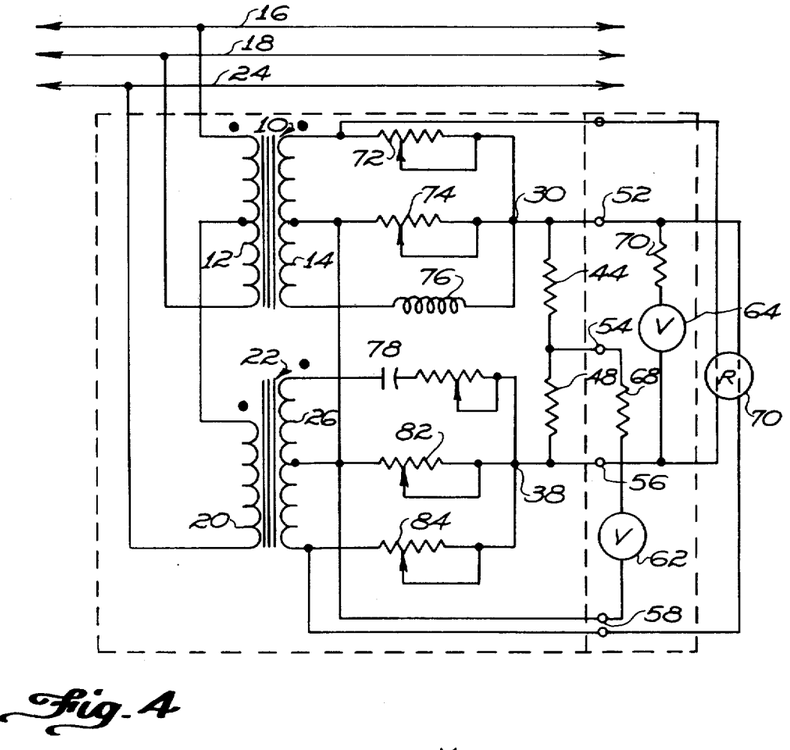
FIG. 4 is an electrical schematic diagram illustrating another embodiment of the polyphase signal monitoring system of the present invention.

FIG. 4 illustrates another embodiment of the signal monitoring system of the present invention. In view of the similarities between the schematic diagram of FIG. 4 and the schematic diagram illustrated in FIG. 1, the corresponding circuit elements of FIG. 4 are designated by the same numerals.

As illustrated, the phase shifting networks are modified to include inductive and capacitive elements as opposed to the capacitive elements 28, 36 of FIG. 1. More particularly, the polarity terminal of the secondary winding 14 of transformer 10 is coupled through a potentiometer 72 to the juncture point 30, the center tap terminal of the secondary winding 14 is coupled through a potentiometer 74 to the juncture point 30, and the non-polarity terminal of the secondary winding 14 is coupled through an inductor 76 to the juncture point 30. Also, the movable contacts of the potentiometers 72, 74 are connected in common to the juncture point 30.

Similarly, the polarity terminal of the secondary winding 26 of transformer 22 is connected through a series-connected capacitor 78 and potentiometer 80 to the juncture point 38, the center-tap terminal of secondary winding 26 is connected through a potentiometer 82 to the juncture point 38, and the non-polarity terminal of the secondary winding 26 is connected through a potentiometer 84 to the juncture point 38. Also, the movable contacts of the potentiometers 80, 82, 84 are connected in common to the juncture point 38.

Figure 5:
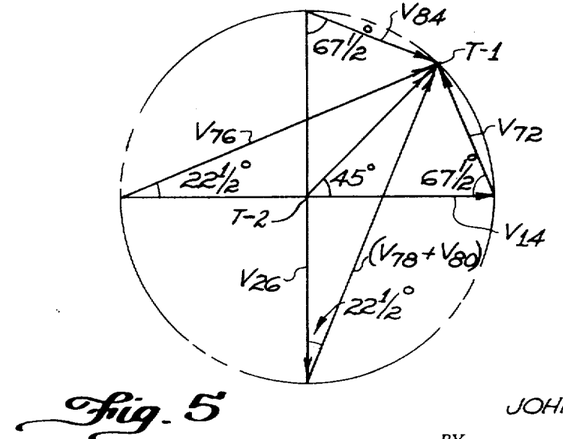
FIG. 5 is a phasor diagram illustrating the voltage phasors of the signal monitoring system shown in FIG. 4 under balanced three-phase conditions.

As illustrated in FIG. 5, the potentiometers 72, 74, 80, 82, 84, the inductor 76, and the capacitor 78 may be adjusted to provide voltages across the phase shifting networks which correspond to the voltages which appear across the phase shifting networks of FIG. 1. Potentiometer 80 serves to provide similar losses for the capacitor 78 as exist in the inductor 76. In actual practice, two of the three potentiometers 74, 80, and 82 can be eliminated. The specific ones to be eliminated is dependent upon the losses in the inductor and the errors in the transformer turns ratios. The voltage phasor $V_{76}$ represents the voltage developed across the inductor 76 which leads the voltage developed across the secondary winding 14 of transformer 10 by a phase angle of 22½°. As in FIG. 2, the effect of calibrating potentiometers, and losses are omitted for clarity. The voltage phasor $V_{72}$ represents the voltage developed across the potentiometer 72 which lags the voltage $-V_{14}$ developed across the secondary winding 14 by 67½°. Similarly, the voltage phasor $(V_{78} + V_{80})$ represents the voltage developed across the capacitor 78 and potentiometer 80 which lags the voltage developed across the secondary winding 26 of transformer 22 by a phase angle of 22½°. Also, the phasor $V_{84}$ represents the voltage developed across the potentiometer 84 which leads the voltage developed across the secondary winding 26 by a phase angle of 67½°.

As illustrated in FIG. 4, the volt meter 64 is connected to measure the difference in the values of the voltages developed across the potentiometer 74 and the potentiometer 82. This voltage, as with the embodiment illustrated in FIG. 1, represents the negative sequence voltage of the polyphase signal.

The volt meter 62 is connected to terminal 54 and through equal value resistors 44 and 48 to develop an indication of the average voltage appearing across the potentiometers 74, 82 with respect to the common midpoint of the system which is applied to output terminal 58. Thus, the volt meter 62 provides an indication of one-half of the value of the positive sequence voltage, and through calibration can read the true positive sequence value. Similarly, the frequency determining measurement is made in the same manner as described in the explanation of FIGS. 1 and 2 by determining the relative phase angle of the positive sequence phasor.

Figure 6:
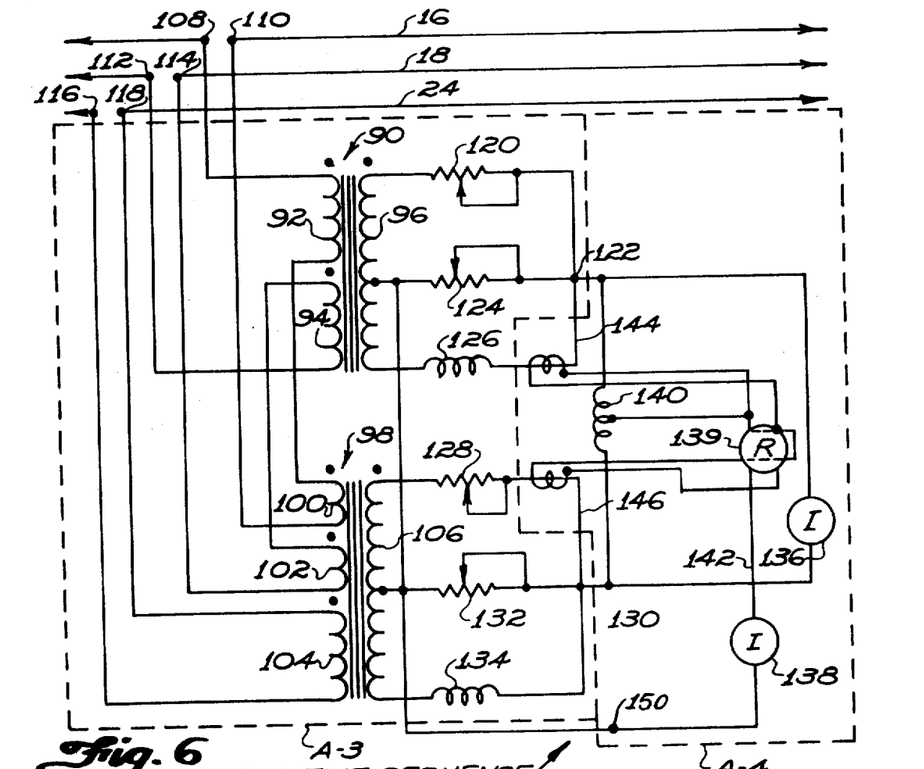
FIG. 6 is an electrical schematic diagram illustrating still another embodiment representative of current monitoring of the polyphase signal monitoring system of the present invention; and, FIGS. 7a through 7d are phasor diagrams illustrating the current and flux phasors of the signal monitoring system shown in FIG. 6 under balanced three-phase conditions.

Reference is now made to FIG. 6 which illustrates still another embodiment of a signal monitoring system of the present invention. This monitoring system provides an output indication of the positive and negative sequence currents, as well as the frequency, of a three-phase signal. This signal monitoring system generally comprises a signal separating circuit A-3 and a monitoring circuit A-4.

More particularly, the signal separating circuit A-3 includes a current transformer 90 having a first primary winding 92, a second primary winding 94, and a center-tapped secondary winding 96. Also included is a second current transformer 98 having a first primary winding 100, a second primary winding 102, a third primary winding 104, and a center-tapped secondary winding 106. Windings 100 and 102 each have one half as many turns as each of windings 92, 94 and 104 which are equal. Secondary windings 96 and 106 have the same number of turns on each.

The supply line 16 is open-circuited to provide a pair of input terminals 108, 110. Similarly, the supply line 18 is open-circuited to provide a pair of input terminals 112, 114. In addition, the supply line 24 is open-circuited to provide a pair of input terminals 116, 118.

The polarity terminal of the input winding 92 of transformer 90 is connected to the input terminal 108, the non-polarity terminal of winding 92 is connected to the polarity terminal of the winding 100 of the transformer 108, and the non-polarity terminal of the winding 100 is connected to input terminal 110. The non-polarity input terminal of the second primary winding 94 of transformer 90 is connected to the input terminal 112, the polarity terminal of this winding is connected to the polarity terminal of the winding 102 of transformer 98, and the non-polarity terminal of winding 102 is connected directly to the input terminal 114. Also, the non-polarity terminal of the winding 104 of the transformer 98 is connected to the input terminal 116 and the polarity terminal of this winding is connected to input terminal 118. The current signal monitoring system thus described has the embodiment of connecting directly into the power conductors to illustrate this mode of connection which is not feasible with most previous sequence component separation devices. It is evident that such direct connection is not mandatory and conventional current transformers may be substituted for the indicated conductor breaks 108, 110 and 112, 114 and 116, 118. The use of only two current transformers, in those circumstances where such is conventionally suitable on a three phase system is also an acceptable connection for the present invention.

As illustrated, the polarity terminal of the secondary winding 96 of transformer 90 is connected through a potentiometer 120 to a juncture point 122, the center-tap terminal of the secondary winding 96 is connected through a potentiometer 124 to the juncture point 122, and the non-polarity terminal of the secondary winding 96 is connected through an inductor 126 to the juncture point 122. Also, the movable contacts of the potentiometers 120, 124 are connected in common to the juncture point 122.

Similarly, the polarity terminal of the secondary winding 106 of transformer 98 is connected through a potentiometer 128 to a juncture point 130, the center-tap terminal of the secondary winding 106 is connected through a potentiometer 132 to the juncture point 130, and the non-polarity terminal of secondary winding 106 is connected through an inductor 134 to the juncture point 130. Also, the movable contacts of the potentiometers 128, 132 are connected in common to the juncture point 130. In addition, the center-tap terminal of secondary winding 96 of transformer 90 is connected in common with the center-tap terminal of the secondary winding 106 of the transformer 98.

Figures 7A, 7B, 7C, 7D:
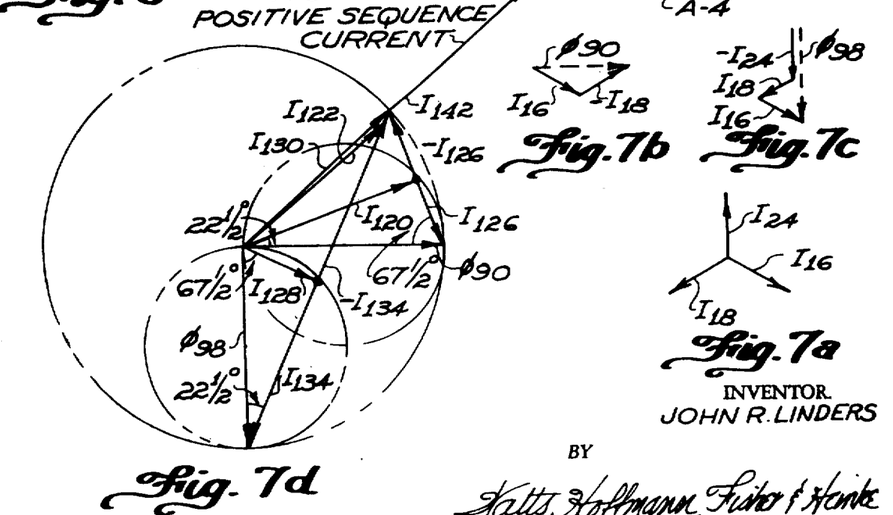

The monitoring circuit A-4 generally comprises a pair of ammeters 136, 138 and an electronic ratio detector meter 139 for measuring the ratio of currents. More particularly, the ammeter 136 is coupled between the juncture point 122 and the juncture point 130 for measuring the negative sequence current in the three-phase supply signal. The ammeter 138 is coupled between the commonly-connected center-tap terminals of the secondary windings 96, 106 and a center-tap terminal of an inductor 140. The outer terminals of the inductor 140 are coupled between the juncture point 122 and the juncture point 130. Finally, the two input circuits of the electronic ratio detector meter, 139 are connected in series opposition and coupled to conductor 142 extending between the ammeter 138 and the center-tap terminal of the inductor 140. One input of ratio detector meter 139 is also inductively coupled to conductor 144 extending between the inductor 126 and the juncture point 122. The other input of ratio detector meter 139 is similarly inductively coupled to conductor 146 extending between potentiometer 128 and the juncture point 130. FIGS. 7a through 7d generally illustrate the phasor fluxes and currents of the signal monitoring system illustrated in FIG. 6. More particularly, FIG. 7a is a phasor diagram illustrating the three current phasors which appear on the supply lines 16, 18, 24. The phasor $I_{16}$ represents the current appearing on the first supply line 16. The phasor $I_{18}$ represents the current appearing on the second supply line 18, and the phasor $I_{24}$ represents the current appearing on the third supply line 24.

FIG. 7b is a phasor diagram illustrating the phasor currents $I_{16}$, $I_{18}$ and the resultant phasor flux $\phi_{90}$, established in the transformer 90.

FIG. 7c is a phasor diagram illustrating the phasor currents $I_{16}$, $I_{18}$ at one half value to allow for winding 100 and 102 having only one half as many turns as windings 92, 94 and 104, and the phasor current $I_{24}$ at full value. The resultant phasor $\phi_{98}$ represents the flux developed in the transformer 98.

FIG. 7d illustrates the operation of the signal monitoring circuit shown in FIG. 6. More particularly, the flux phasor $\phi_{90}$, $\phi_{98}$ represent the fluxes developed in the transformer 90, 98. The phasor current $I_{120}$ represents the current appearing in the potentiometers 120 which leads the flux $\phi_{90}$ by a phase angle of 22½°. The current phasor $I_{126}$ represents the current appearing in the inductor 126 which lags the flux $\phi_{90}$ by 67½°.

Similarly, the current phasor $I_{128}$ represents the current appearing in potentiometer 128 which leads the flux $\phi_{98}$ by a phase angle of 67½°. The current phasor $I_{134}$ represents the current appearing in the inductor 134 which lags the flux $\phi_{98}$ by a phase angle of 22½°. As illustrated in FIG. 6, the ammeter 136 is connected to measure the difference between the currents flowing through juncture points 122, 130. This current difference represents the negative phase sequence current, and under balanced conditions as illustrated in FIG. 7 equals zero amperes. Similarly, the ammeter 138 is connected to measure the sum of the currents flowing through juncture points 122, 130 with respect to the common center-tap terminals of transformers 90, 98. This current $I_{142}$ represents the value of the positive phase sequence current as illustrated in FIG. 7d.

Thus, as with the voltage signal monitoring system, as the frequency of the three phase signal varies, the phasors representing the negative and positive sequence currents merely travel along a locus defined by the outer circle of FIG. 7d. Accordingly, even with a variation in the frequency, the difference in the currents which flow through juncture points 122, 130 remains substantially zero under balanced conditions. The magnitude of the positive phase sequence current also remains unchanged with variations in frequency. These negligible frequency effects follow the same equations as demonstrated for the voltage circuit, FIGS. 1 and 2.

Similar to FIGS. 1 and 2 for the voltage monitoring system, the system frequency determination may be made with an electronic ratio detector 139, connected to read the ratio of the positive sequence current with respect to the difference in currents in a resistive branch and an inductive branch circuit of the monitoring network.

Although the invention has been described in conjunction with a preferred embodiment, and the measurement of specific parameters of the polyphase system, it is contemplated that various changes in form and parts may be made without departing from the spirit and scope of the invention as defined by the appended claims.

Having thus described my invention, I claim:

1. A polyphase signal monitoring system comprising at least first, second, and third input terminals adapted to be coupled to a polyphase line;

first circuit means having an input circuit means coupled to said first and second input terminals and having an output circuit means for developing a first signal of a predetermined amplitude;

second circuit means having an input circuit means coupled to said third input terminal and having an output circuit means for developing a second signal having an amplitude substantially equal to said predetermined amplitude and being substantially 90° out of phase with said first signal;

first phase shifting network means coupled across said output circuit means of said first circuit means for developing a third signal being a predetermined number of degrees out of phase with said first signal;

second phase shifting network means coupled across said output circuit means of said second circuit means for developing a fourth signal being a predetermined number of degrees out of phase with said second signal; and, signal monitoring means coupled to said first and second phase shifting network means for providing an output indication of the values of a said third signal and a said fourth signal to thereby provide an indication of the value of parameters of a polyphase signal.

2. A signal monitoring system as defined in claim 1 wherein said first circuit means includes a transformer having an input circuit coupled to said first and second input terminals and an output circuit means for developing a said first signal.

3. A signal monitoring system as defined in claim 1 wherein said second circuit means includes a transformer having an input circuit coupled to said third input terminal and an output circuit means for developing a said second signal.

4. A signal monitoring system as defined in claim 1 wherein said first circuit means includes a transformer having an input circuit coupled to said first and second input terminals and an output circuit means for developing a said first signal; and, said second circuit means includes a transformer having an input circuit coupled to said third input terminal and an output circuit means for developing a said second signal.

5. A signal monitoring system as defined in claim 1 wherein said first phase shifting network means includes a reactive circuit means and a resistive circuit means coupled across said output circuit means of said first circuit means.

6. A signal monitoring system as defined in claim 1 wherein said first phase shifting network means includes an inductive reactance circuit means and a resistive circuit means coupled across said output circuit means of said first circuit means.

7. A signal monitoring system as defined in claim 1 wherein said first phase shifting network means includes a capacitive reactance means and a resistive circuit means coupled across said output circuit means of said first circuit means.

8. A signal monitoring system as defined in claim 5 wherein said reactive circuit means and said resistive circuit means are coupled in series connection with respect to each other across said output circuit means of said first circuit means.

9. A signal monitoring circuit as defined in claim 5 wherein said signal measuring means provides an output indication of the value of a voltage developed from a junction point between said resistive circuit means and said reactive circuit means, and said second phase shifting circuit means.

10. A signal monitoring system as defined in claim 1 wherein said second phase shifting network means includes a reactive circuit means and a resistive circuit means coupled across said output circuit means of said second circuit means.

11. A signal monitoring system as defined in claim 1 wherein said second phase shifting network means includes an inductive circuit means and a resistive circuit means coupled across said output circuit means of said second circuit means.

12. A signal monitoring system defined in claim 1 wherein said second phase shifting network means includes a capacitive reactance means and a resistive circuit means coupled across said output circuit means of said second circuit means.

13. A signal monitoring system as defined in claim 10 wherein said reactive circuit means and said resistive circuit means are coupled in series connection with respect to each other across said output circuit means of said second circuit means.

14. A signal monitoring system as defined in claim 1 including common circuit means coupled between said output circuit means of said first circuit means and said output circuit means of said second circuit means.

15. A signal monitoring system as defined in claim 1 wherein said signal monitoring means includes circuit means for providing a said output indication representative of the difference between the value of a said third signal and the value of a said fourth signal.

16. A signal monitoring system as defined in claim 1 wherein said signal monitoring means includes circuit means for providing a said output indication representative of the sum of the value of a said third signal and the value of a said fourth signal.

17. A signal monitoring system as defined in claim 1 wherein said signal monitoring means includes circuit means for providing a said output indication representative of the ratio of the value of a said third signal and the value of a said fourth signal to thereby provide an output indication of the frequency of the polyphase signal.

18. A signal monitoring system as defined in claim 15 wherein said signal monitoring means includes second circuit means for providing a second output indication representative of the sum of the values of a said third signal and a said fourth signal.

19. A polyphase signal monitoring system comprising:

first circuit means for developing a first control signal having a value representative of the sum of the values of positive and negative phase sequence components of a polyphase system;

second circuit means for developing a second control signal having a value representative of the difference of the values of said positive and negative phase sequence components;

summing circuit means for developing a first output signal having a value representative of the value of a positive phase sequence component of a polyphase signal; and, difference circuit means for developing a second output signal having a value representative of the value of a negative phase sequence component of a polyphase signal to thereby provide an indication of the value of parameters of a polyphase signal.

20. A signal monitoring system as defined in claim 19 wherein said first circuit means includes a transformer having an input circuit adapted to be coupled to two lines of a polyphase line and an output circuit means for developing a said first control signal.

21. A signal monitoring system as defined in claim 19 wherein said second circuit means includes a transformer having an input circuit adapted to be coupled to at least one line of a polyphase line and an output circuit means for developing a said second signal.

22. A signal monitoring system as defined in claim 19 wherein said first circuit means includes a transformer having an input circuit adapted to be coupled to two lines of a polyphase supply line and an output circuit means for developing a said first signal; and, said second circuit means includes a transformer having an input circuit adapted to be coupled to a third line of a said polyphase supply line and an output circuit means for developing a said second signal.

23. A multiphase signal monitoring system comprising first, second, and third input terminals adapted to be coupled to a multiphase supply line;

first circuit means having an input circuit means coupled to said first and second input terminals and having an output circuit means for developing a first signal of a predetermined amplitude;

second circuit means having an input circuit means coupled to said third input terminal and having an output circuit means for developing a second signal having an amplitude substantially equal to said predetermined amplitude and being substantially 90° out of phase with said first signal;

first reactive circuit means coupled across said output circuit means of said first circuit means for providing a third signal being out of phase with a said first signal;

first resistive circuit means coupled across said output circuit means of said first circuit means for providing a fourth signal;

second reactive circuit means coupled across said output circuit means of said second circuit means for providing a fifth signal being out of phase with a said second signal;

second resistive circuit means coupled across said output circuit means of said second circuit means for providing a sixth signal; and, signal measuring means coupled to said first and second resistive circuit means for providing an output indication of the value of a said fourth signal with respect to the value of a said sixth signal to thereby provide an indication of the value of parameters of a polyphase signal.

24. A signal monitoring system as defined in claim 23 wherein said signal monitoring means includes circuit means for providing a said output indication representative of the difference between the value of a said third signal and the value of a said fourth signal.

25. A signal monitoring system as defined in claim 23 wherein said signal monitoring means includes circuit means for providing a said output indication representative of the sum of the value of a said third signal and the value of a said fourth signal.

26. A signal monitoring system as defined in claim 23 wherein said first reactive circuit means and said first resistive circuit means are coupled in series connection with respect to each other across said output circuit means of said first circuit means, and said second reactive circuit means and said second resistive circuit means are coupled in series connection with respect to each other across said output circuit means of said second circuit means.

27. A signal monitoring system as defined in claim 23 wherein said first circuit means includes a transformer having an input circuit coupled to said first and second input terminals and an output circuit means for developing a said first signal.

28. A signal monitoring system as defined in claim 23 wherein said second circuit means includes a transformer having an input circuit coupled to said third input terminal and an output circuit means for developing a said second signal.

29. A signal monitoring system as defined in claim 23 wherein said first circuit means includes a transformer having an input circuit coupled to said first and second input terminals and an output circuit means for developing a said first signal; and, said second circuit means includes a transformer having an input circuit coupled to said third input terminal and an output circuit means for developing a said second signal.

30. A polyphase signal monitoring system comprising first, second, and third input terminals adapted to be coupled to a polyphase supply line;

first circuit means having an input circuit means coupled to said first and second input terminals and having an output circuit means for developing a first signal which defines a first phasor;

second circuit means having an input circuit means coupled to said third input terminal and having an output circuit means for developing a second signal which defines a second phasor having a common midpoint with respect to a said first phasor;

first phase shifting network means coupled across said output circuit means of said first circuit means for developing a third signal being a predetermined number of degrees out of phase with said first signal;

second phase shifting network means coupled across said output circuit means of said second circuit means for developing a fourth signal being a predetermined number of degrees out of phase with said second signal; and, signal monitoring means coupled to said first and second phase shifting network means for providing an output indication representative of the value of a said third signal with respect to the value of a said fourth signal to thereby provide an indication of the value of parameters of a polyphase signal.

31. A signal monitoring system as defined in claim 30 wherein said first circuit means includes a transformer having an input circuit coupled to said first and second input terminals and an output circuit means for developing a said first signal.

32. A signal monitoring system as defined in claim 30 wherein said second circuit means includes a transformer having an input circuit coupled to said third input terminal and an output circuit means for developing a said second signal.

33. A signal monitoring system as defined in claim 30 wherein said first circuit means includes a transformer having an input circuit coupled to said first and second input terminals and an output circuit means for developing a said first signal; and, said second circuit means includes a transformer having an input circuit coupled to said third input terminal and an output circuit means for developing a said second signal.

34. A signal monitoring system as defined in claim 30 wherein said first phase shifting network means includes a reactive circuit means and a resistive circuit means coupled across said output circuit means of said first circuit means.

35. A signal monitoring system as defined in claim 30 wherein said first phase shifting network means includes an inductive reactance circuit means and a resistive circuit means coupled across said output circuit means of said first circuit means.

36. A polyphase signal monitoring system comprising at least first, second, and third input terminals adapted to be coupled to a polyphase supply line;

first circuit means having an input circuit means coupled to said first and second input terminals and having an output circuit means for developing a first signal which defines a first phasor;

second circuit means having an input circuit means coupled to said third input terminal and having an output circuit means having a common midpoint with respect to a said first output circuit means of said first circuit means for developing a second signal which defines a second phasor;

first phase shifting network means coupled across said output circuit means of said first circuit means for developing a third signal being a predetermined number of degrees out of phase with respect to a said first signal and having a magnitude substantially independent of the frequency of signals on the polyphase supply line;

second phase shifting network means coupled across said output circuit means of said second circuit means for developing a fourth signal being a predetermined number of degrees out of phase with said second signal; and, signal monitoring means coupled to said first and second phase shifting network means for providing an output indication of the value of a said third signal with respect to the value of a said fourth signal to thereby provide an indication of the value of parameters of a polyphase signal.

37. A signal monitoring system as defined in claim 30 wherein said first phase shifting network means includes a capacitive reactance circuit means and a resistive circuit means coupled across said output circuit means of said first circuit means.

38. A signal monitoring system as defined in claim 36 wherein said signal monitoring means includes circuit means for providing a said output indication representative of the difference between the value of a said third signal and the value of a said fourth signal.

39. A signal monitoring system as defined in claim 36 wherein said signal monitoring means includes circuit means for providing a said output indication representative of the sum of the value of a said third signal and the value of a said fourth signal.

40. A signal monitoring system as defined in claim 36 wherein said signal monitoring means includes circuit means for providing a said output indication representative of the ratio of the value of a said third signal and the value of a said fourth signal to thereby provide an output indication of the frequency of the polyphase signal.

41. A signal monitoring system as defined in claim 38 wherein said signal monitoring means includes second circuit means for providing a second output indication representative of the sum of the values of a said third signal and a said fourth signal.

42. A signal monitoring system as defined in claim 36 wherein said first circuit means includes a transformer having an input circuit coupled to said first and second input terminals and an output circuit means for developing a said first signal.

43. A signal monitoring system as defined in claim 36 wherein said second circuit means includes a transformer having an input circuit coupled to said third input terminal and an output circuit means for developing a said second signal.

44. A signal monitoring system as defined in claim 36 wherein said first circuit means includes a transformer having an input circuit coupled to said first and second input terminals and an output circuit means for developing a said first signal; and, said second circuit means includes a transformer having an input circuit coupled to said third input terminal and an output circuit means for developing a said second signal.

45. A signal monitoring system as defined in claim 36 wherein said first phase shifting network means includes a reactive circuit means and a resistive circuit means coupled across said output circuit means of said first circuit means.

46. A signal monitoring system as defined in claim 1 wherein said signal measuring means includes input circuit means coupled to said first phase shifting network, said output circuit means of said second circuit means, said second phase shifting network and said output circuit means of said first circuit means for receiving said first, second, third and fourth signals, and output circuit means for developing an output signal having a value representative of the ratio between the potential difference of said first and third signals and the potential difference of the second and fourth signals to thereby provide an output signal having a value indicative of the frequency of signals on the polyphase line.

47. A signal monitoring system for measuring signals on a polyphase system comprising at least first, second, and third input terminals adapted to be coupled to the polyphase system;

first circuit means having an input circuit means coupled to said first and second input terminals and having an output circuit means for developing a first signal of a given frequency and of a predetermined amplitude;

second circuit means having an input circuit means coupled to said third input terminal and having an output circuit means for developing a second signal having a phase which is substantially 90° out of phase with said first signal;

first phase shifting network means coupled across said output circuit means of said first circuit means for developing a third signal having an amplitude which is substantially independent of the frequency of said first signal and being a predetermined number of degrees out of phase with said first signal;

second phase shifting network means coupled across said output circuit means of said second circuit means for developing a fourth signal having an amplitude which is substantially independent of the frequency of said second signal and being substantially in phase with said third signal when the signals on the polyphase system are in phase balance; and, signal monitoring means coupled to said first and second phase shifting network means for providing an output indication of the values of a said third signal and a said fourth signal to thereby provide an indication of the value of parameters of a polyphase signal.

48. A signal monitoring system for measuring signals on a polyphase system comprising at least first, second, and third input terminals adapted to be coupled to the polyphase system;

first circuit means having an input circuit means coupled to said first and second input terminals and having an output circuit means for developing a first signal of a given frequency and of a predetermined amplitude;

second circuit means having an input circuit means coupled to said third input terminal and having an output circuit means for developing a second signal having a phase which is substantially 90° out of phase with said first signal;

first phase shifting network means coupled across said output circuit means of said first circuit means for developing a third signal being a predetermined number of degrees out of phase with said first signal and having an amplitude which is substantially independent of the frequency of said first signal and of a value substantially equal to one-half the amplitude of said first signal;

second phase shifting network means coupled across said output circuit means of said second circuit means for developing a fourth signal having an amplitude which is substantially independent of the frequency of said second signal and being substantially in phase with said third signal when the signals on the polyphase system are in phase balance and of a value substantially equal to one-half the amplitude of said second signal; and, signal monitoring means coupled to said first and second phase shifting network means for providing an output indication of the values of a said third signal and a said fourth signal to thereby provide an indication of the value of parameters of a polyphase signal.

49. A signal monitoring system as defined in claim 30 wherein said first phase shifting network means includes a capacitive reactance circuit means and a resistive circuit means coupled across said output circuit means of said first circuit means.

50. A signal monitoring system as defined in claim 30 wherein said signal monitoring means includes circuit means for providing a said output indication representative of the difference between the value of a said third signal and the value of a said fourth signal.

51. A signal monitoring system as defined in claim 30 wherein said signal monitoring means includes circuit means for providing a said output indication representative of the sum of the value of a said third signal and the value of a said fourth signal.

52. A signal monitoring system as defined in claim 30 wherein said signal monitoring means includes circuit means for providing a said output indication representative of the ratio of the value of a said third signal and the value of a said fourth signal to thereby provide an output indication of the frequency of the polyphase signals.

53. A signal monitoring system as defined in claim 50 wherein said signal monitoring means includes second circuit means for providing a second output indication representative of the sum of the values of a said third signal and a said fourth signal.

54. A signal monitoring system as defined in claim 36 wherein said first phase shifting network means includes an inductive reactance circuit means and a resistive circuit means coupled across said output circuit means of said first circuit means.

55. A signal monitoring system for measuring signals on a polyphase system comprising at least first, second, and third input terminals adapted to be coupled to the polyphase system;

first phase shifting means coupled to said first and said second input terminals for developing a first signal having a given amplitude and phase angle;

second phase shifting means coupled to said third input terminal for developing a second signal having an amplitude which is substantially equal to the amplitude of said first signal and being substantially in phase with said first signal when the signals on the polyphase system are in phase balance; and, signal monitoring means coupled to said first and second phase shifting means for providing an output indication of the values of a said first signal and a said second signal to thereby provide an indication of the value of parameters of the polyphase system.

56. A signal monitoring system for measuring signals on a polyphase system comprising;

first phase shifting means having an input circuit coupled to a polyphase system for receiving a first signal of a given phase angle and having an output circuit means for developing a second signal having a given amplitude and being a predetermined number of degrees out of phase with respect to said first signal;

second phase shifting means coupled to a polyphase system for receiving a third signal which is substantially 90° out of phase with respect to said first signal and having an output circuit means for developing a fourth signal being a predetermined number of degrees out of phase with respect to said third signal having an amplitude which is substantially equal to the amplitude of said second signal and being substantially in phase with said second signal when the polyphase system is in phase balance; and, signal monitoring means coupled to said first and second phase shifting means for providing an output indication of the values of a said second signal and a said fourth signal to thereby provide an indication of the value of parameters of the polyphase system.

57. An apparatus as defined in claim 56 including circuit means coupling said first and second phase shifting circuit means for referencing the midpoints of said second and fourth signals to a common voltage potential.

58. An apparatus as defined in claim 56 including circuit means coupling said first and second phase shifting circuit means for referencing the midpoints of said second and fourth signals to a common current level.

59. A signal monitoring system as defined in claim 57 wherein said signal monitoring means includes a summing circuit for measuring the positive phase sequence component of the polyphase system.

60. A signal monitoring system as defined in claim 57 wherein said signal monitoring means includes a difference circuit for measuring the negative phase sequence component of the polyphase system.

* * * * *